(12) United States Patent
Tsai (10) Patent No.: US 9,236,823 B2
(45) Date of Patent: Jan. 12, 2016

(54) POWER GENERATOR DEVICE

(71) Applicant: Jun-Dong Power Corporation, Taoyuan County (TW)

(72) Inventor: Ming-Chun Tsai, Taoyuan County (TW)

(73) Assignee: JUN-DONG POWER CORPORATION (TW)

( * ) Notice: Subject to any disclaimer, the term of this patent is extended or adjusted under 35 U.S.C. 154(b) by 214 days.

(21) Appl. No.: 14/075,881

(22) Filed: Nov. 8, 2013

(65) Prior Publication Data

US 2014/0210425 A1    Jul. 31, 2014

(30) Foreign Application Priority Data

Jan. 28, 2013    (TW) ................................. 102103154

(51) Int. Cl.
| | | |
|---|---|---|
| *H02P 9/02* | (2006.01) | |
| *H02K 53/00* | (2006.01) | |
| *H02K 7/02* | (2006.01) | |

(52) U.S. Cl.
CPC *H02P 9/02* (2013.01); *H02K 7/025* (2013.01); *H02K 53/00* (2013.01); *Y02E 60/16* (2013.01)

(58) Field of Classification Search
CPC .......... H02K 7/025; H02K 53/00; H02P 9/02; Y02E 60/16
USPC ................... 322/4, 38; 310/74; 318/150, 161
See application file for complete search history.

(56) References Cited

U.S. PATENT DOCUMENTS

| | | | | |
|---|---|---|---|---|
| 6,236,123 | B1 * | 5/2001 | Pinkerton | 310/12.12 |
| 7,129,593 | B2 * | 10/2006 | King et al. | 290/4 C |
| 8,053,940 | B2 * | 11/2011 | McCulley | 310/74 |
| 8,749,083 | B2 | 6/2014 | Nomoto et al. | 290/44 |
| 2004/0207266 | A1 * | 10/2004 | Abel et al. | 307/80 |
| 2007/0120430 | A1 * | 5/2007 | Kurosawa | 310/74 |
| 2008/0143302 | A1 * | 6/2008 | Pierce | 322/4 |
| 2008/0180067 | A1 * | 7/2008 | Kurosawa | 322/4 |
| 2010/0270800 | A1 * | 10/2010 | Krietzman et al. | 290/44 |
| 2013/0043679 | A1 * | 2/2013 | Nomoto | 290/44 |
| 2013/0175953 | A1 * | 7/2013 | Astley et al. | 318/161 |
| 2014/0062095 | A1 * | 3/2014 | Tkadlec | 290/55 |

FOREIGN PATENT DOCUMENTS

| | | | |
|---|---|---|---|
| CN | 101789727 | 7/2010 | ............ H02N 11/00 |
| JP | 2003-166463 | 6/2003 | ............... F03G 3/00 |
| JP | 2004-266883 | 9/2004 | ............... H02P 9/00 |
| TW | 201142140 | 12/2011 | ............... F03D 1/00 |
| WO | WO 2004/109099 | 12/2004 | ............... F03D 1/06 |

(Continued)

*Primary Examiner* — Tulsidas C Patel
*Assistant Examiner* — Viet Nguyen
(74) *Attorney, Agent, or Firm* — Hayes Soloway P.C.

(57) ABSTRACT

A power generator device includes a heavy gyro body, at least one rotation-driving device and a control unit. The heavy gyro body is coupled to a power source and an induction power generator, the power source drives the heavy gyro body to rotate so as to drive the induction power generator to produce electricity. The rotation-driving device is located at an edge of the heavy gyro body and conducting a contact or non-contact interaction with an annular part in reaction to drive the heavy gyro body to rotate about a vertical spindle. The control unit is configured for starting the rotation-driving device to accelerate the speed of the heavy gyro body when a rotation speed of the heavy gyro body is less than a first predetermined rotation speed.

9 Claims, 9 Drawing Sheets (56) References Cited

FOREIGN PATENT DOCUMENTS

| WO | WO2010082011 | 7/2010 | ............... F03B 9/00 |
| WO | WO 2011/151943 | 12/2011 | ............... F03D 9/00 |
| WO | WO 2011151943 A1 * | 12/2011 | |

* cited by examiner

POWER GENERATOR DEVICE

RELATED APPLICATIONS

This application claims priority to Taiwan Application Serial Number 102103154, filed Jan. 28, 2013, which is herein incorporated by reference.

BACKGROUND

1. Field of Invention

The present invention relates to a power generator device.

2. Description of Related Art

With the rapid growth in commercial/industrial activities and comfortable living needs in recent years, there is a higher demand and dependency on electric power. Currently, electric power is generated mainly from nuclear power, coal, oil, gas, wind, ground heat, and solar energy.

The energy resources on the Earth are continuously exhausted. However, power consumption is increasing every day. Therefore, the environmental demands are increasing and environmental pollution is getting worse. In view of the limited energy resources on the Earth, it is imperative for scientists to find new substitute energy.

Currently, there are pros and cons for nuclear power usage; its further development, in particular, has caused a long-term debate. As to waterpower, most of the water resources have been utilized and the impact of waterpower to nature is always criticized; its future is also very limited. In addition, the environmental pollution and greenhouse effect due to burning coals are not yet solved, either.

Facing foreseeable energy shortages in the future and under the condition of being unable to find new substitute energy, it is of consequence to use any method and mechanism to generate the power to reduce the energy crisis impact for humans.

SUMMARY

It is therefore an objective of the present invention to provide a power generator device to deal with the problems as discussed in the prior art.

In accordance with the foregoing and other objectives of the present invention, a power generator device includes a heavy gyro body, at least one rotation-driving device and a control unit. The heavy gyro body is coupled to a power source and an induction power generator, the power source drives the heavy gyro body to rotate so as to drive the induction power generator to produce electricity. The rotation-driving device is located at an edge of the heavy gyro body and conducting a contact or non-contact interaction with an annular part in reaction to drive the heavy gyro body to rotate about a vertical spindle. The control unit is configured for starting the rotation-driving device to accelerate the speed of the heavy gyro body when a rotation speed of the heavy gyro body is less than a first predetermined rotation speed.

In another embodiment disclosed herein, the control unit is further configured for stopping the rotation-driving device to accelerate the speed of the heavy gyro body when the rotation speed of the heavy gyro body is greater than a second predetermined rotation speed, the second predetermined rotation speed is greater than the first predetermined rotation speed.

In another embodiment disclosed herein, the power generator device further includes a rotation speed detector configured to measure the rotation speed of the heavy gyro body.

In another embodiment disclosed herein, the rotation-driving device includes a first rotation disk, which has a plurality of first magnets at a circumference thereof.

In another embodiment disclosed herein, the power generator device further includes a second rotation disk which is concentrically arranged with the heavy gyro body, the second rotation disk having a plurality of second magnets at a circumference thereof, wherein the rotation-driving device drives the first rotation disk to rotate, the first magnets and the second magnets are interacted magnetically in reaction to drive the heavy gyro body to rotate relative to the second rotation disk.

In another embodiment disclosed herein, the power generator device further includes a hollow cylinder windshield arranged around the heavy gyro body, the hollow cylinder windshield has a plurality of third magnets, wherein the rotation-driving device drives the first rotation disk to rotate and the first magnets and the third magnets are interacted magnetically in reaction to drive the heavy gyro body to rotate relative to the hollow cylinder windshield.

In another embodiment disclosed herein, the rotation-driving device includes a first rotation disk.

In another embodiment disclosed herein, the power generator device further includes a second rotation disk which is concentrically arranged with the heavy gyro body, wherein the rotation-driving device drives the first rotation disk to rotate and the first rotation disk and the second rotation disk are interacted by a friction therebetween in reaction to drive the heavy gyro body to rotate relative to the second rotation disk.

In another embodiment disclosed herein, the power generator device further includes a hollow cylinder windshield disposed around the heavy gyro body, wherein the rotation-driving device drives the first rotation disk to rotate and the first rotation disk and the hollow cylinder windshield are interacted by a friction therebetween in reaction to drive the heavy gyro body to rotate relative to the hollow cylinder windshield.

In another embodiment disclosed herein, the power generator device further includes a second rotation disk which is concentrically arranged with the heavy gyro body, wherein the rotation-driving device drives the first rotation disk to rotate and the first rotation disk and the second rotation disk are interacted by a transmission belt in reaction to drive the heavy gyro body to rotate relative to the second rotation disk.

Thus, the power generator device of the present invention is equipped with at least the following advantages: (1) because the rotation-driving device is located on the rotating heavy gyro body, less power (i.e., electricity) is needed to be supplied to the rotation-driving device to accelerate the heavy gyro body up to a higher rotation speed; (2) the rotation-driving device is located at an edge of the heavy gyro body and conducts a contact interaction or non-contact interaction with an annular part in reaction to drive the heavy gyro body 104 to rotate; and the rotation-driving device is equipped with a longer arm (a distance between the rotation-driving device and a center of the heavy gyro body) to easily provide the heavy gyro body with a rotational energy required; (3) the control unit is used to set the timing for the rotation-driving device to accelerate the heavy gyro body, thereby enabling an overall power output of the power generator device to be cost-effective.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1:
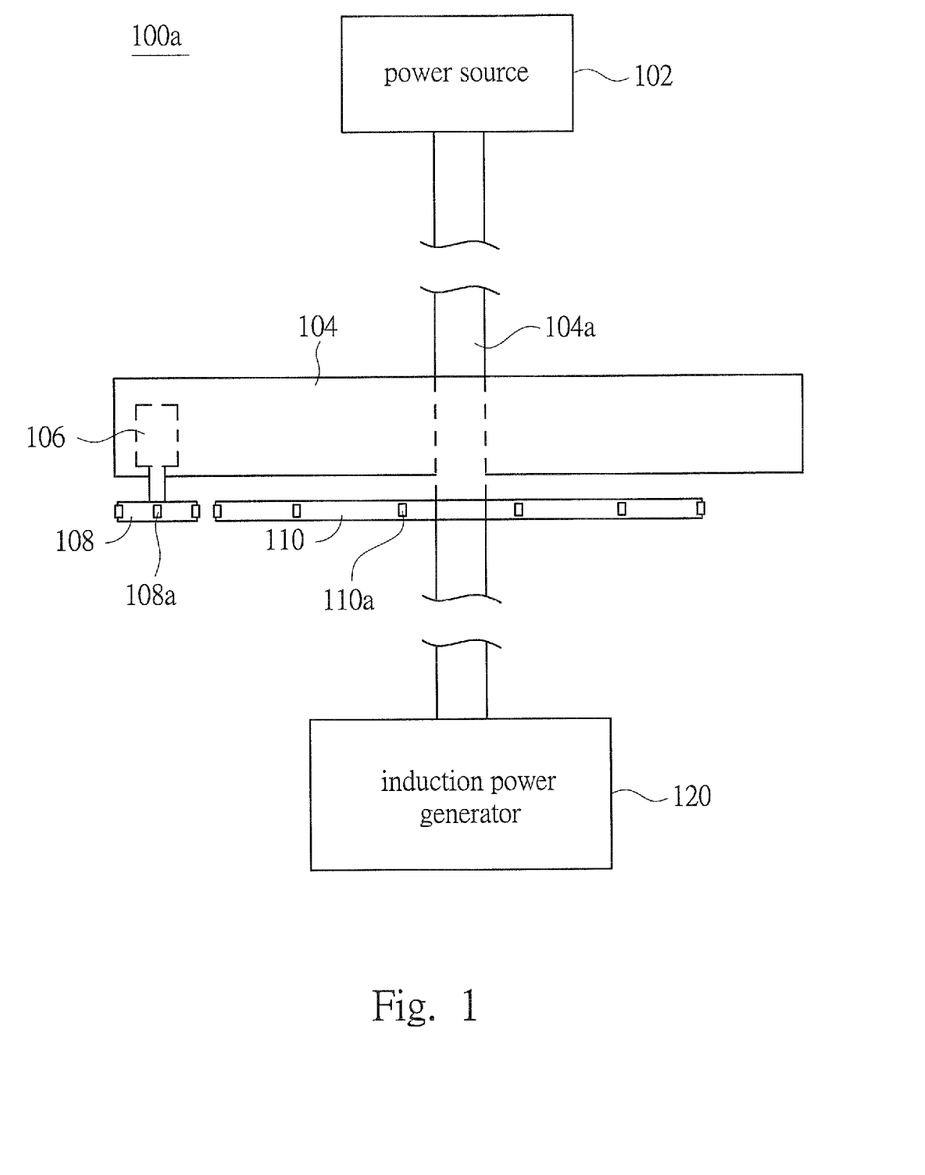
FIG. 1 illustrates a side view of a power generator device according to a first embodiment of this invention.
Figure 2:
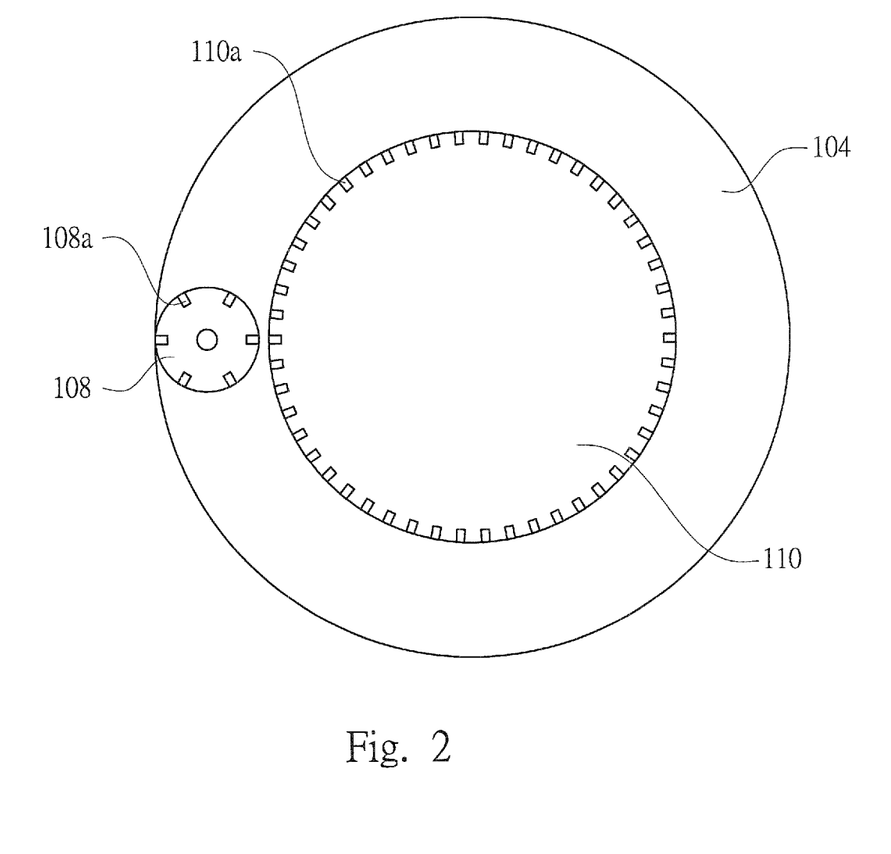
FIG. 2 illustrates a bottom view of the power generator device in FIG. 1.

FIG. 1 illustrates a side view of a power generator device according to a first embodiment of this invention, and FIG. 2 illustrates a bottom view of the power generator device in FIG. 1. A power generator device 100a includes a heavy gyro body 104, at least one rotation-driving device 106 and an induction power generator 120. The heavy gyro body 104 has a vertical spindle 104a. The vertical spindle 104a has a first end (e.g., an upper end) coupled to a power source 102 and a second end (e.g., a lower end) coupled to the induction power generator 120. The power source 102 may be hydro, wind or other natural sources of power. Natural hydro or wind powers may not be stable. When the power source 102 drives the heavy gyro body 104 at a rotation speed less than a predetermined rotation speed, the rotation-driving device 106 is started to accelerate the speed of the heavy gyro body 104, thereby maintaining the heavy gyro body 104 at a stable rotation speed to drive the induction power generator 120 to produce electricity. Because the rotation-driving device 106 is located on the rotating heavy gyro body 104, less power (i.e., electricity) is needed to be supplied to the rotation-driving device 106 to accelerate the heavy gyro body 104 up to a higher rotation speed. The induction power generator 120 may be, but not limited to, an induction power generator.

The rotation-driving device 106 is located at an edge of the heavy gyro body 104 and conducts a non-contact interaction with an annular part (e.g., a still annular part) in reaction to drive the heavy gyro body 104 to rotate about the vertical spindle 104a. In this embodiment, the rotation-driving device 106 includes a first rotation disk 108, which is fastened to a rotation rod of the rotation-driving device 106. The first rotation disk 108 has a plurality of first magnets 108a at a circumference thereof. In this embodiment, the annular part is a second rotation disk 110, which is concentrically arranged with the heavy gyro body 104, i.e., the second rotation disk 110 and the heavy gyro body 104 share a common central axis. The second rotation disk 110 has a plurality of second magnets 110a at a circumference thereof. The rotation-driving device 106 drives the first rotation disk 108 to rotate and the first magnets 108a and the second magnets 110a are interacted magnetically (i.e., non-contact interaction) in reaction to drive the heavy gyro body 104 to rotate relative to the still second rotation disk 110. In this embodiment, the second rotation disk 110 is equipped with a greater size than the first rotation disk 108, but is not limited to.

The heavy gyro body 104 may be made of a material having high density such as lead (Pb) and thus has a large mass. Initially, a large amount of energy is required to drive the heavy gyro body 104 to rotate. However, after the heavy gyro body 104 rotates stably, the required energy to maintain the rotation of the heavy gyro body 104 considerably decreases.

In this embodiment, the first rotation disk 108 and the second rotation disk 110 are located under the heavy gyro body 104, but may be located above the heavy gyro body 104 in other embodiments. In addition, there are several other mechanisms (e.g., a gear set) that can be interconnected between the heavy gyro body 104 and the power source 102 or the induction power generator 120, not limited to the vertical spindle.

Figure 3:
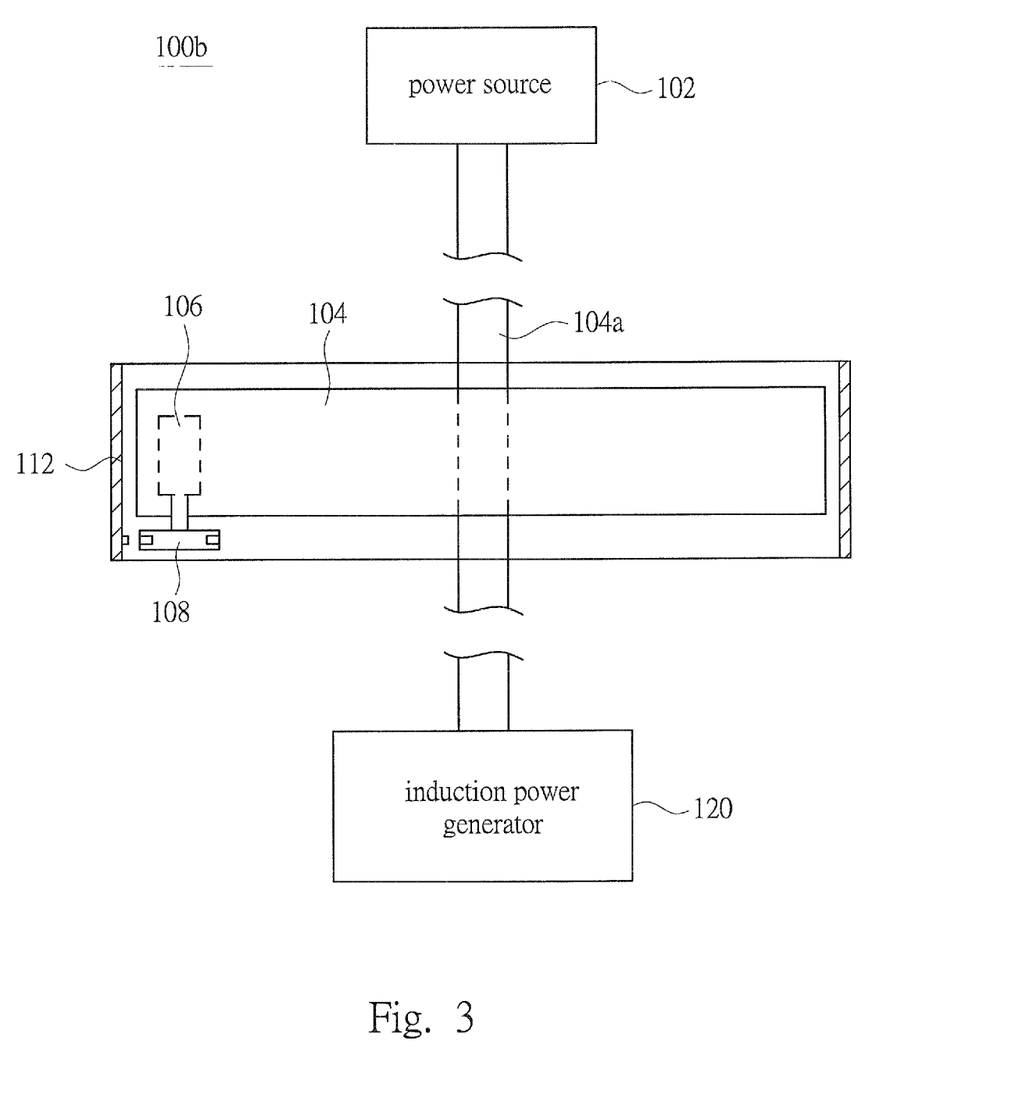
FIG. 3 illustrates a side view of a power generator device according to a second embodiment of this invention.
Figure 4:
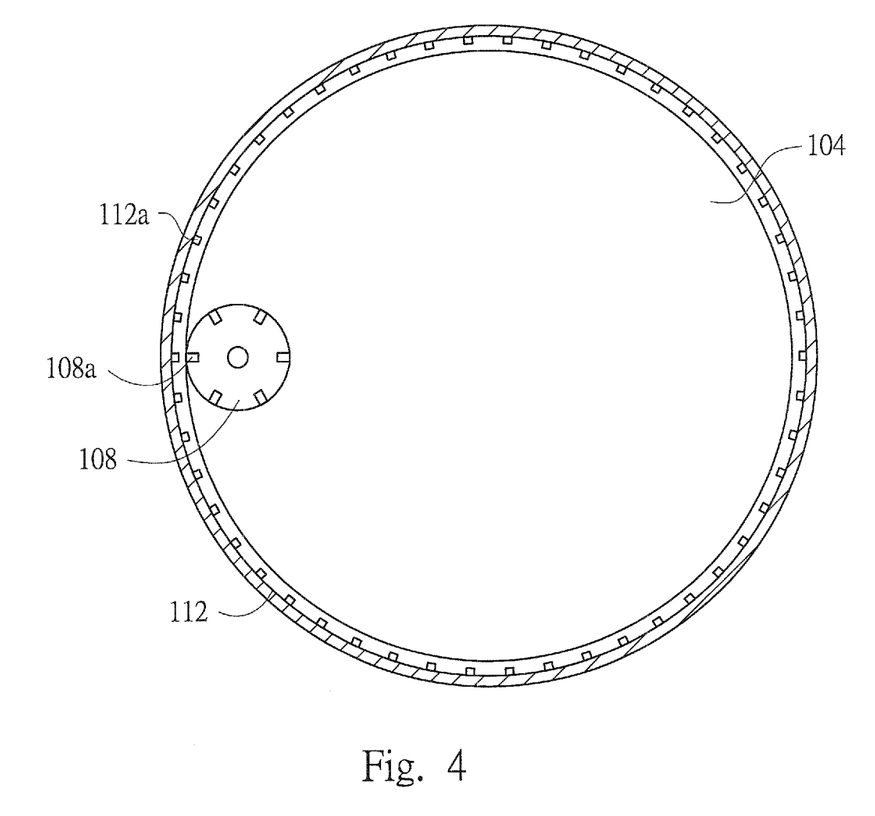
FIG. 4 illustrates a bottom view of the power generator device in FIG. 3.

FIG. 3 illustrates a side view of a power generator device according to a second embodiment of this invention, and FIG. 4 illustrates a bottom view of the power generator device in FIG. 3. A power generator device 100b includes a heavy gyro body 104, at least one rotation-driving device 106 and an induction power generator 120. The heavy gyro body 104 has a vertical spindle 104a. The vertical spindle 104a has a first end (e.g., an upper end) coupled to a power source 102 and a second end (e.g., a lower end) coupled to the induction power generator 120. The power source 102 may be hydro, wind or other natural sources of power. Natural hydro or wind powers may not be stable. When the power source 102 drives the heavy gyro body 104 at a rotation speed less than a predetermined rotation speed, the rotation-driving device 106 is started to accelerate the speed of the heavy gyro body 104, thereby maintaining the heavy gyro body 104 at a stable rotation speed to drive the induction power generator 120 to produce electricity. Because the rotation-driving device 106 is located on the rotating heavy gyro body 104, less power (i.e., electricity) is needed to be supplied to the rotation-driving device 106 to accelerate the heavy gyro body 104 up to a higher rotation speed. The induction power generator 120 may be, but not limited to, an induction power generator.

The rotation-driving device 106 is located at an edge of the heavy gyro body 104 and conducts a non-contact interaction with an annular part (e.g., a still annular part) in reaction to drive the heavy gyro body 104 to rotate about the vertical spindle 104a. In this embodiment, the rotation-driving device 106 includes a first rotation disk 108, which is fastened to a rotation rod of the rotation-driving device 106. The first rotation disk 108 has a plurality of first magnets 108a at a circumference thereof. In this embodiment, the annular part is a hollow cylinder windshield 112, which is concentrically arranged with the heavy gyro body 104, i.e., the hollow cylinder windshield 112 and the heavy gyro body 104 share a common central axis. The hollow cylinder windshield 112 has a plurality of third magnets 112a at a circumference thereof. The rotation-driving device 106 drives the first rotation disk 108 to rotate and the first magnets 108a and the third magnets 112a are interacted magnetically (i.e., non-contact interaction) in reaction to drive the heavy gyro body 104 to rotate relative to the still hollow cylinder windshield 112. In this embodiment, the hollow cylinder windshield 112 is equipped with an inner diameter greater than a diameter of the first rotation disk 108, and also greater than a diameter of the heavy gyro body 104.

The heavy gyro body 104 may be made of a material having high density such as lead (Pb) and thus has a large mass. Initially, a large amount of energy is required to drive the heavy gyro body 104 to rotate. However, after the heavy gyro body 104 rotates stably, the required energy to maintain the rotation of the heavy gyro body 104 considerably decreases.

In this embodiment, the first rotation disk 108 and the second rotation disk 110 are located under the heavy gyro body 104, but may be located above the heavy gyro body 104 in other embodiments. In addition, there are several other mechanisms (e.g., a gear set) that can be interconnected between the heavy gyro body 104 and the power source 102 or the induction power generator 120, not limited to the vertical spindle.

Figure 5:
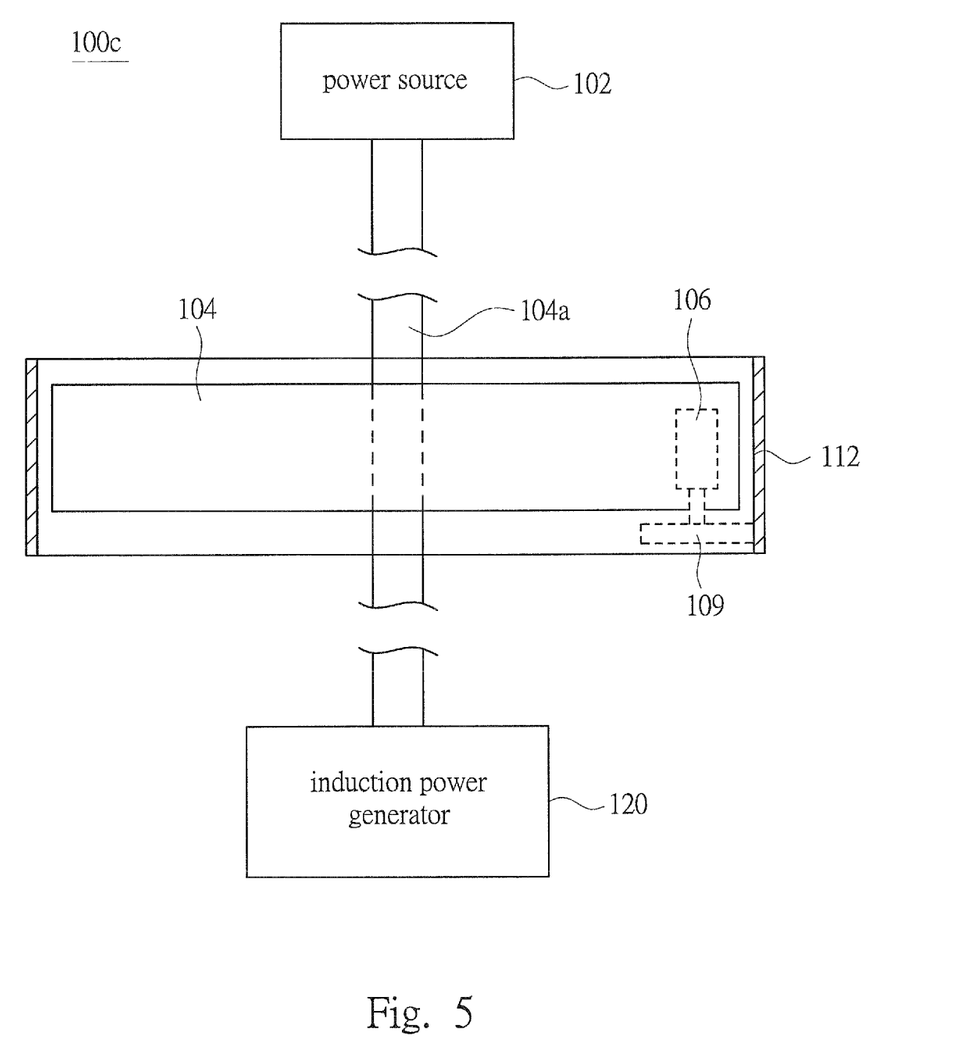
FIG. 5 illustrates a side view of a power generator device according to a third embodiment of this invention.
Figure 6:
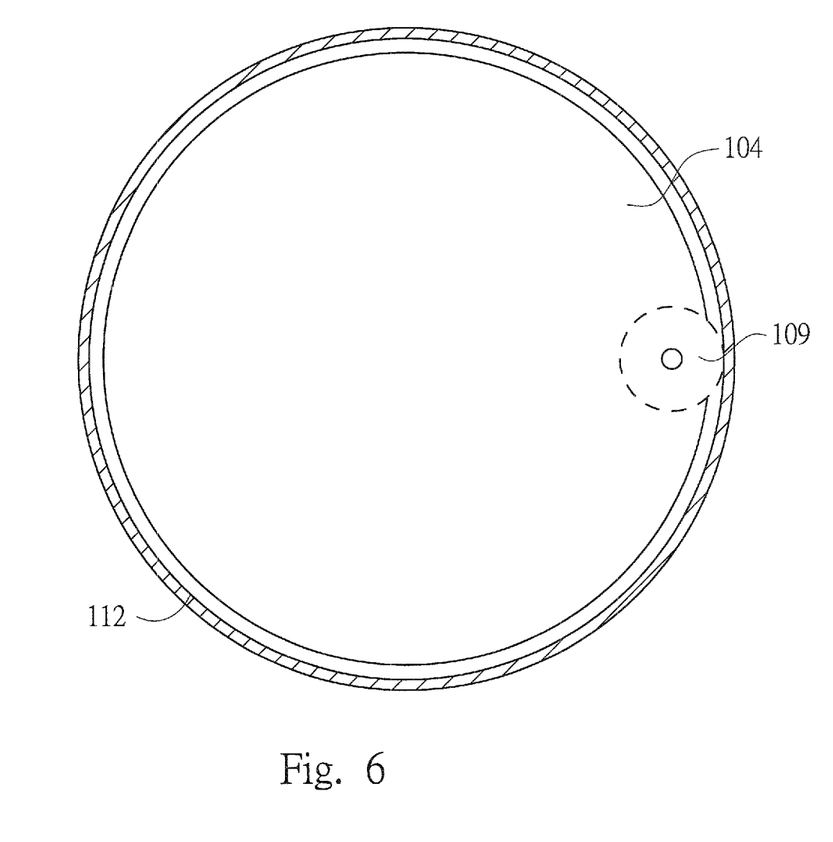
FIG. 6 illustrates a bottom view of the power generator device in FIG. 5.

FIG. 5 illustrates a side view of a power generator device according to a third embodiment of this invention, and FIG. 6 illustrates a bottom view of the power generator device in FIG. 5. A power generator device 100c includes a heavy gyro body 104, at least one rotation-driving device 106 and an induction power generator 120. The heavy gyro body 104 has a vertical spindle 104a. The vertical spindle 104a has a first end (e.g., an upper end) coupled to a power source 102 and a second end (e.g., a lower end) coupled to the induction power generator 120. The power source 102 may be hydro, wind or other natural sources of power. Natural hydro or wind powers may not be stable. When the power source 102 drives the heavy gyro body 104 at a rotation speed less than a predetermined rotation speed, the rotation-driving device 106 is started to accelerate the speed of the heavy gyro body 104, thereby maintaining the heavy gyro body 104 at a stable rotation speed to drive the induction power generator 120 to produce electricity. Because the rotation-driving device 106 is located on the rotating heavy gyro body 104, less power (i.e., electricity) is needed to be supplied to the rotation-driving device 106 to accelerate the heavy gyro body 104 up to a higher rotation speed. The induction power generator 120 may be, but not limited to, an induction power generator.

The rotation-driving device 106 is located at an edge of the heavy gyro body 104 and conducts a contact interaction with an annular part (e.g., a still annular part) in reaction to drive the heavy gyro body 104 to rotate about the vertical spindle 104a. In this embodiment, the rotation-driving device 106 includes a first rotation disk 109, which is fastened to a rotation rod of the rotation-driving device 106. In this embodiment, the annular part is a hollow cylinder windshield 112, which is concentrically arranged with the heavy gyro body 104 (i.e., the hollow cylinder windshield 112 and the heavy gyro body 104 share a common central axis) and arranged around the heavy gyro body 104. The rotation-driving device 106 drives the first rotation disk 109 to rotate and the first rotation disk 109 and hollow cylinder windshield 112 are interacted by a friction therebetween (i.e., a contact interaction) in reaction to drive the heavy gyro body 104 to rotate relative to the still hollow cylinder windshield 112. In this embodiment, the hollow cylinder windshield 112 is equipped with an inner diameter greater than a diameter of the first rotation disk 108, and also greater than a diameter of the heavy gyro body 104.

The heavy gyro body 104 may be made of a material having high density such as lead (Pb) and thus has a large mass. Initially, a large amount of energy is required to drive the heavy gyro body 104 to rotate. However, after the heavy gyro body 104 rotates stably, the required energy to maintain the rotation of the heavy gyro body 104 considerably decreases.

In this embodiment, there are several other mechanisms (e.g., a gear set) that can be interconnected between the heavy gyro body 104 and the power source 102 or the induction power generator 120, not limited to the vertical spindle.

Figure 7:
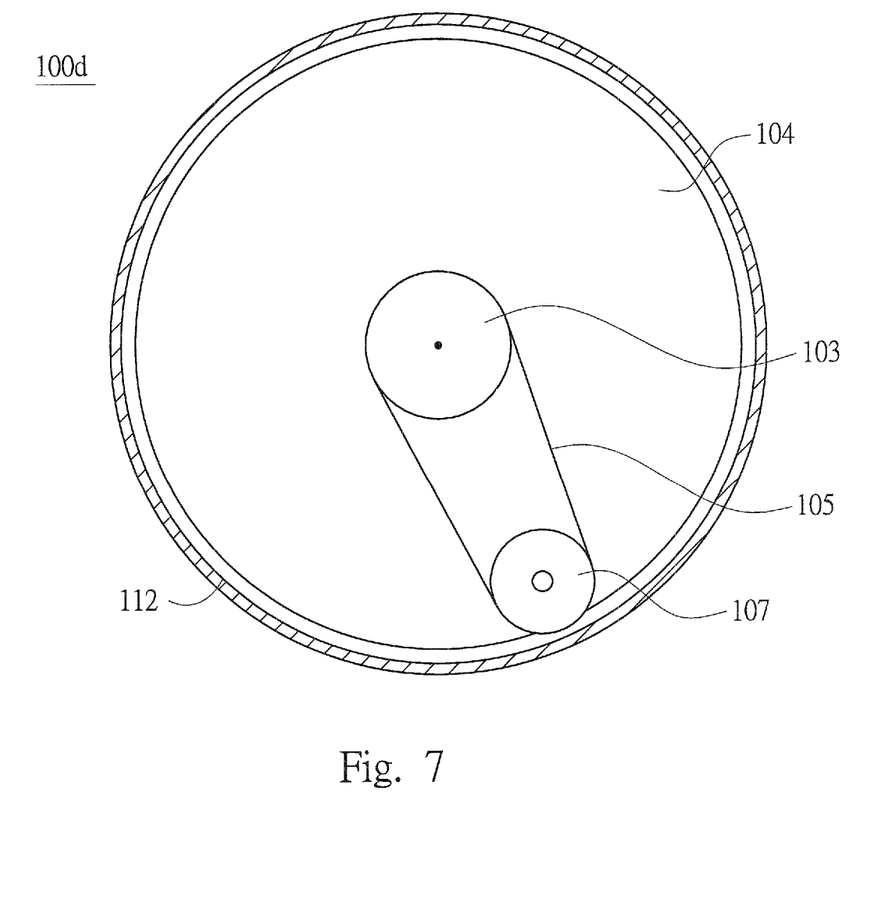
FIG. 7 illustrates a side view of a power generator device according to a fourth embodiment of this invention.

FIG. 7 illustrates a side view of a power generator device 100d according to a fourth embodiment of this invention. The power generator device 100d is different from the power generator device 100a in that a first rotation disk 107 interacts with a second rotation disk 103 by a transmission belt 105 (i.e., a contact interaction), rather than a non-contact interaction. The rotation-driving device drives the first rotation disk 107 to rotate and the first rotation disk 107 and the second rotation disk 103 are interacted by the transmission belt 105 (i.e., a contact interaction) in reaction to drive the heavy gyro body 104 to rotate relative to the still second rotation disk 103.

Figure 8:
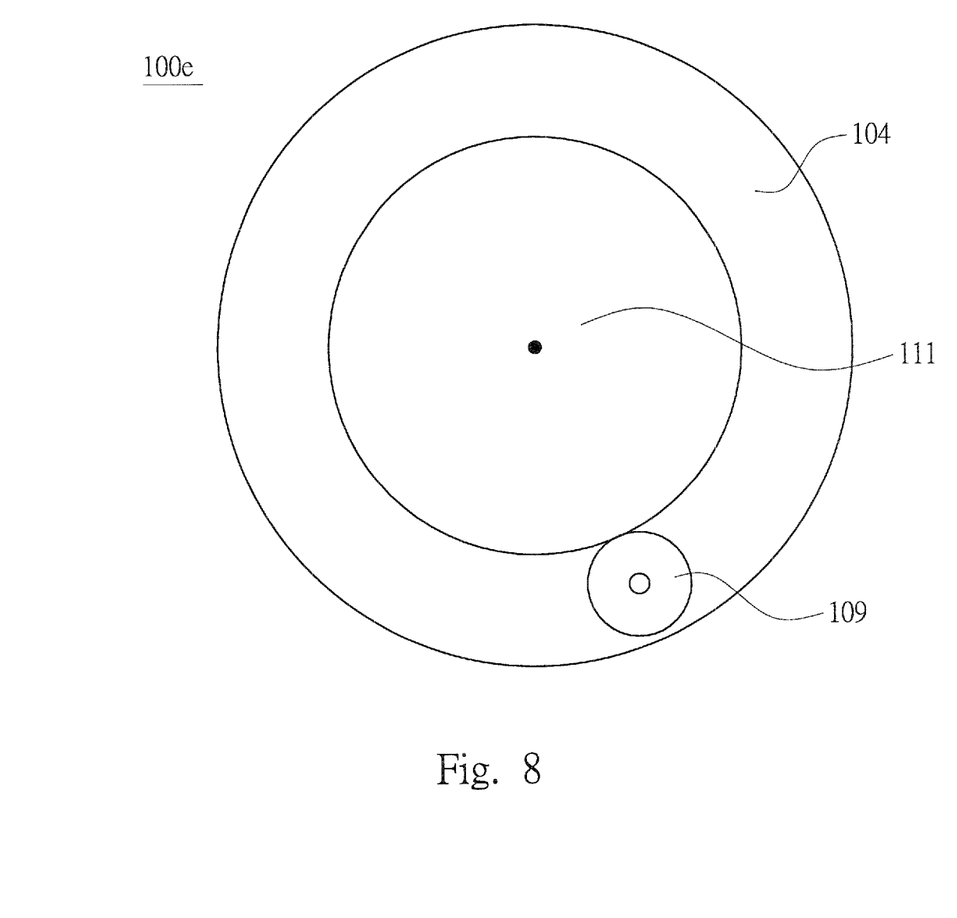
FIG. 8 illustrates a bottom view of a power generator device according to a fifth embodiment of this invention.

FIG. 8 illustrates a bottom view of a power generator device according to a fifth embodiment of this invention. The power generator device 100e is different from the power generator device 100a in that the first rotation disk 109 interacts with the second rotation disk 111 by a friction therebetween (i.e., a contact interaction), rather than a non-contact interaction. The rotation-driving device drives the first rotation disk 109 to rotate and the first rotation disk 109 and the second rotation disk 111 are interacted by the friction therebetween (i.e., a contact interaction) in reaction to drive the heavy gyro body 104 to rotate relative to the still second rotation disk 111.

Figure 9:
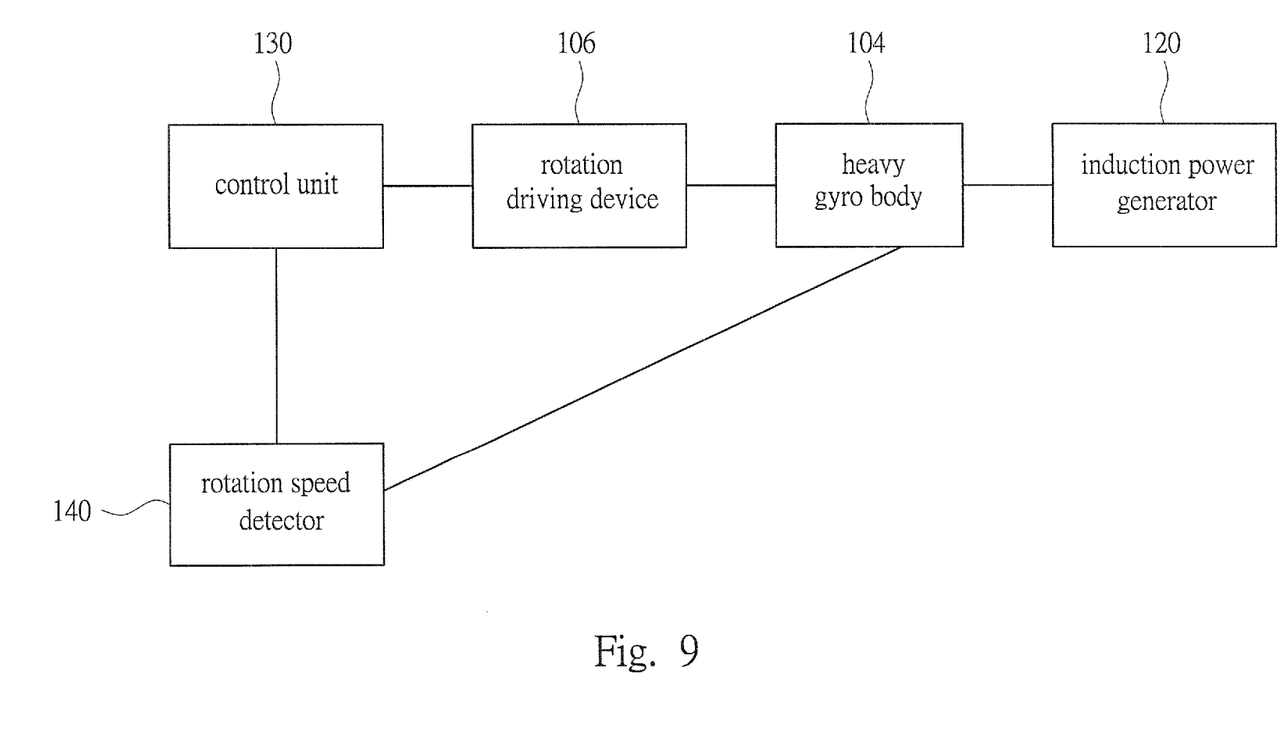
FIG. 9 illustrates a functional block diagram of a power generator device according to a sixth embodiment of this invention.

FIG. 9 illustrates a functional block diagram of a power generator device according to a sixth embodiment of this invention. In this embodiment, the power generator device further includes a control unit 130 and a rotation speed detector 140a for controlling the rotation-driving device 106. The rotation speed detector 140 is used to measure a rotation speed of the heavy gyro body 104. The control unit 130 is electrically connected with the rotation speed detector 140 to determine whether a rotation speed of the heavy gyro body 104 is less than a first predetermined rotation speed. When the rotation speed of the heavy gyro body 104 is less than the first predetermined rotation speed, the rotation-driving device 106 is started to accelerate the speed of the heavy gyro body 104. When the rotation speed of the heavy gyro body 104 is greater than a second predetermined rotation speed (the second predetermined rotation speed is greater than the first predetermined rotation speed), the control unit 130 is to stop the rotation-driving device 106 (i.e., not to accelerate the speed of the heavy gyro body 104). When the rotation speed of the heavy gyro body 104 is less than the first predetermined rotation speed, the induction power generator 120 does not generate electricity efficiently and the rotation-driving device 106 is thus started to accelerate the speed of the heavy gyro body 104. When the rotation speed of the heavy gyro body 104 is at about the second predetermined rotation speed (the second predetermined rotation speed is greater than the first predetermined rotation speed), the induction power generator 120 maximizes its efficiency of generating electricity. When the rotation speed of the heavy gyro body 104 is greater than a second predetermined rotation speed, the rotation speed of the heavy gyro body 104 is no longer accelerated by the rotation-driving device 106. The first, second predetermined rotation speeds could be decided according to actual induction power generators and/or applied natural power sources and would not be fixed values. Thus, no values are provided to the first, second predetermined rotation speeds herein. In addition, setting a first predetermined rotational speed also need to consider a power-consuming cost of the rotation-driving device 106. That is, the electricity power generated by the induction power generator 120 needs to be economical after being deducted by the power-consuming cost of the rotation-driving device 106.

According to the above-discussed embodiments, the power generator device of the present invention is equipped with at least the following advantages: (1) because the rotation-driving device is located on the rotating heavy gyro body, less power (i.e., electricity) is needed to be supplied to the rotation-driving device to accelerate the heavy gyro body up to a higher rotation speed; (2) the rotation-driving device is located at an edge of the heavy gyro body and conducts a contact interaction or non-contact interaction with an annular part in reaction to drive the heavy gyro body 104 to rotate; and the rotation-driving device is equipped with a longer arm (a distance between the rotation-driving device and a center of the heavy gyro body) to easily provide the heavy gyro body with a rotational energy required; (3) the control unit is used to set the timing for the rotation-driving device to accelerate the heavy gyro body, thereby enabling an overall power output of the power generator device to be cost-effective.

Although the present invention has been described in considerable detail with reference to certain embodiments thereof, other embodiments are possible. Therefore, the spirit and scope of the appended claims should not be limited to the description of the embodiments contained herein.

What is claimed is:

1. A power generator device comprising:
   a heavy gyro body coupled to a power source and an induction power generator, the power source driving the heavy gyro body to rotate so as to drive the induction power generator to produce electricity;
   at least one rotation-driving device disposed at an edge of the heavy gyro body and conducting a contact or non-contact interaction with an annular part in reaction to drive the heavy gyro body to rotate about a vertical spindle, wherein the rotation-driving device comprises a first rotation disk which has a plurality of first magnets at a circumference thereof, the annular part comprises a second rotation disk which is concentrically arranged with the heavy gyro body, the second rotation disk having a plurality of second magnets at a circumference thereof, the rotation-driving device drives the first rotation disk to rotate, the first magnets and the second magnets are interacted magnetically in reaction to drive the heavy gyro body to rotate relative to the second rotation disk; and
   a control unit configured for starting the rotation-driving device to accelerate the speed of the heavy gyro body when a rotation speed of the heavy gyro body is less than a first predetermined rotation speed.

2. The power generator device of claim 1, wherein the control unit is further configured for stopping the rotation-driving device to accelerate the speed of the heavy gyro body when the rotation speed of the heavy gyro body is greater than a second predetermined rotation speed, the second predetermined rotation speed is greater than the first predetermined rotation speed.

3. The power generator device of claim 1 further comprising a rotation speed detector configured to measure the rotation speed of the heavy gyro body.

4. A power generator device comprising:
   a heavy gyro body coupled to a power source and an induction power generator, the power source driving the heavy gyro body to rotate so as to drive the induction power generator to produce electricity;
   at least one rotation-driving device disposed at an edge of the heavy gyro body and conducting a contact or non-contact interaction with an annular part in reaction to drive the heavy gyro body to rotate about a vertical spindle, wherein the rotation-driving device comprises a first rotation disk which has a plurality of first magnets at a circumference thereof, the annular part comprises a hollow cylinder windshield disposed around the heavy gyro body, the hollow cylinder windshield having a plurality of second magnets, wherein the rotation-driving device drives the first rotation disk to rotate and the first magnets and the second magnets are interacted magnetically in reaction to drive the heavy gyro body to rotate relative to the hollow cylinder windshield; and
   a control unit configured for starting the rotation-driving device to accelerate the speed of the heavy gyro body when a rotation speed of the heavy gyro body is less than a first predetermined rotation speed.

5. The power generator device of claim 4, wherein the control unit is further configured for stopping the rotation-driving device to accelerate the speed of the heavy gyro body when the rotation speed of the heavy gyro body is greater than a second predetermined rotation speed, the second predetermined rotation speed is greater than the first predetermined rotation speed.

6. The power generator device of claim 4 further comprising a rotation speed detector configured to measure the rotation speed of the heavy gyro body.

7. A power generator device comprising:
   a heavy gyro body coupled to a power source and an induction power generator, the power source driving the heavy gyro body to rotate so as to drive the induction power generator to produce electricity;
   at least one rotation-driving device disposed at an edge of the heavy gyro body and conducting a contact or non-contact interaction with an annular part in reaction to drive the heavy gyro body to rotate about a vertical spindle, wherein the rotation-driving device includes a first rotation disk, the annular part comprises a hollow cylinder windshield disposed around the heavy gyro body, the rotation-driving device drives the first rotation disk to rotate and the first rotation disk and the hollow cylinder windshield are interacted by a friction therebetween in reaction to drive the heavy gyro body to rotate relative to the hollow cylinder windshield; and
   a control unit configured for starting the rotation-driving device to accelerate the speed of the heavy gyro body when a rotation speed of the heavy gyro body is less than a first predetermined rotation speed.

8. The power generator device of claim 7, wherein the control unit is further configured for stopping the rotation-driving device to accelerate the speed of the heavy gyro body when the rotation speed of the heavy gyro body is greater than a second predetermined rotation speed, the second predetermined rotation speed is greater than the first predetermined rotation speed.

9. The power generator device of claim 7 further comprising a rotation speed detector configured to measure the rotation speed of the heavy gyro body.

* * * * *